R. T. BADGLEY.
PNEUMATIC TIRE.
APPLICATION FILED MAR. 13, 1909.

952,175.

Patented Mar. 15, 1910.

WITNESSES:
F. B. Roy
A. Watson

INVENTOR.
Robert T. Badgley
BY
Clarence S. Watson
ATTORNEY.

UNITED STATES PATENT OFFICE.

ROBERT T. BADGLEY, OF NEW YORK, N. Y.

PNEUMATIC TIRE.

952,175.   Specification of Letters Patent.   Patented Mar. 15, 1910.

Application filed March 13, 1909.   Serial No. 483,308.

*To all whom it may concern:*

Be it known that I, ROBERT T. BADGLEY, a citizen of the United States, residing at New York city, county and State of New York, have invented new and useful Improvements in Pneumatic Tires, of which the following is a specification.

The present invention relates to improvements in pneumatic tires, particularly with respect to the tread surface thereof.

The object of the invention is to produce a pneumatic tire, or a tread member applicable to such a tire, having at the same time a high degree of resiliency and an effective form for securing a hold or a tractive effect between the tire and the road surface.

An embodiment of my invention is illustrated in the accompanying drawings, in which—

Figure 1:
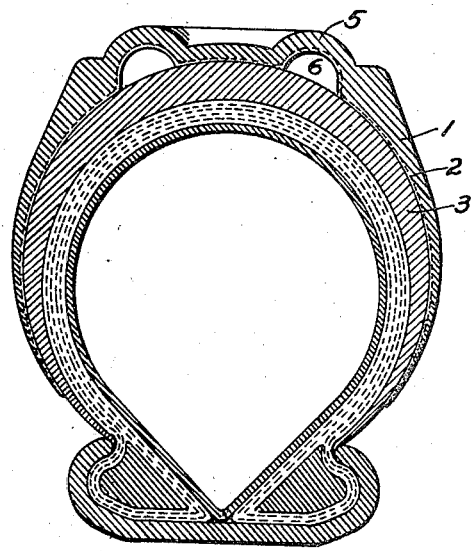
Figure 2:
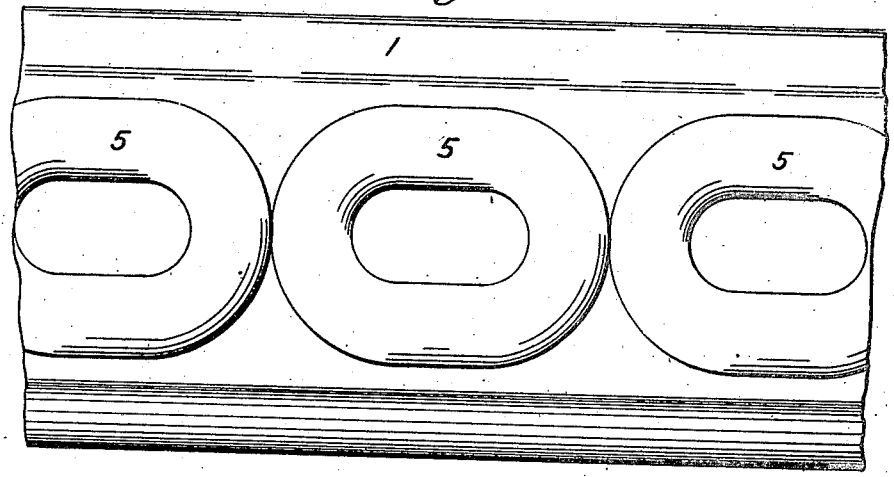

Figure 1 is a transverse section of a tire and rim, and Fig. 2 is a plan view of a portion of the tread.

My invention may be embodied either in the tire itself as originally manufactured, or in a tread-band applicable to a finished tire. I have illustrated the invention in the latter form. For this purpose I provide a rubber band or envelop 1 which is backed and reinforced by suitable fabric 2 upon its inner surface, and is formed to embrace the periphery and the sides of an ordinary pneumatic tire 3.

The hollow projections before referred to are, in the illustrated embodiment of the invention, of annular form, 5, and they inclose air-chambers 6 of corresponding form. It will be apparent that the thickness of the tread is in no degree increased by the projections 5, and that the projections may readily yield, when necessary, until they are substantially flat, so that they cannot be worn and torn away as in the case of solid rubber projections.

The tread-band 1 may be secured to the tire in any convenient way, as for example, by the cold or "acid" process of vulcanization.

My invention is not limited to the embodiment hereinbefore specifically described, but may be embodied in many forms within the nature of the invention and the terms of the following claims:

I claim:—

1. A pneumatic tire having its tread surface provided with projections, depressions within the area bounded by said projections, and air-chambers beneath said projections, as set forth.

2. The combination with the outer tube of a pneumatic tire, of a tread band adapted to be applied thereto and provided with projections, depressions within the area bounded by said projections, and air chambers beneath said projections, the outer surface of said outer tube forming the bottoms of said air-chambers, as set forth.

ROBERT T. BADGLEY.

In the presence of—
CLARENCE G. GALSTON,
FLORENCE B. ROY.